United States Patent
Endo et al.

(10) Patent No.: US 9,031,751 B2
(45) Date of Patent: May 12, 2015

(54) DEVICE FOR CONTROLLING AUTOMATIC TRANSMISSION

(71) Applicants: JATCO Ltd, Fuji-shi, Shizuoka (JP); Nissan Motor Co., Ltd., Yokohama-shi, Kanagawa (JP)

(72) Inventors: Go Endo, Yokohama (JP); Kunihiro Takahashi, Atsugi (JP)

(73) Assignees: JATCO Ltd, Fuji-Shi (JP); Nissan Motor Co., Ltd., Yokohama-Shi (JP)

( * ) Notice: Subject to any disclaimer, the term of this patent is extended or adjusted under 35 U.S.C. 154(b) by 0 days.

(21) Appl. No.: 14/358,475

(22) PCT Filed: Oct. 23, 2012

(86) PCT No.: PCT/JP2012/077278
§ 371 (c)(1),
(2) Date: May 15, 2014

(87) PCT Pub. No.: WO2013/073342
PCT Pub. Date: May 23, 2013

(65) Prior Publication Data
US 2014/0330494 A1    Nov. 6, 2014

(30) Foreign Application Priority Data

Nov. 18, 2011  (JP) .................................. 2011-253029

(51) Int. Cl.
G06F 7/00 (2006.01)
F16H 61/02 (2006.01)
F16H 61/06 (2006.01)
F16H 61/16 (2006.01)
F16H 61/684 (2006.01)
F16H 59/00 (2006.01)

(52) U.S. Cl.
CPC .......... *F16H 61/0204* (2013.01); *F16H 61/684* (2013.01); *F16H 61/061* (2013.01); *F16H 61/16* (2013.01); *F16H 2059/006* (2013.01); *F16H 2306/24* (2013.01)

(58) Field of Classification Search
CPC ....................................................... B60W 10/02
See application file for complete search history.

(56) References Cited

U.S. PATENT DOCUMENTS

| 6,692,408 B2 | 2/2004 | Sato et al. | |
| 2002/0033312 A1* | 3/2002 | Saito | 192/48.4 |
| 2002/0035014 A1* | 3/2002 | Saito | 477/143 |
| 2003/0060329 A1 | 3/2003 | Sato et al. | |

FOREIGN PATENT DOCUMENTS

| JP | 06-346959 A | 12/1994 |
| JP | 10-220574 A | 8/1998 |
| JP | 2003-097689 A | 4/2003 |

* cited by examiner

*Primary Examiner* — David D Le
(74) *Attorney, Agent, or Firm* — Foley & Lardner LLP

(57) ABSTRACT

In a control apparatus for an automatic transmission, a gear shift from a second gear shift stage to a first gear shift stage is inhibited and the gear shift from the first gear shift stage to the second gear shift stage is continued, when, during the gear shift from the first gear shift stage to the second gear shift stage, a request of the gear shift from the second gear shift stage to the first gear shift stage by means of an automatic transmission section has occurred during a time duration from a time at which a gear shift command from the first gear shift stage to the second gear shift stage is issued to a time at which an inertia phase is started.

2 Claims, 7 Drawing Sheets

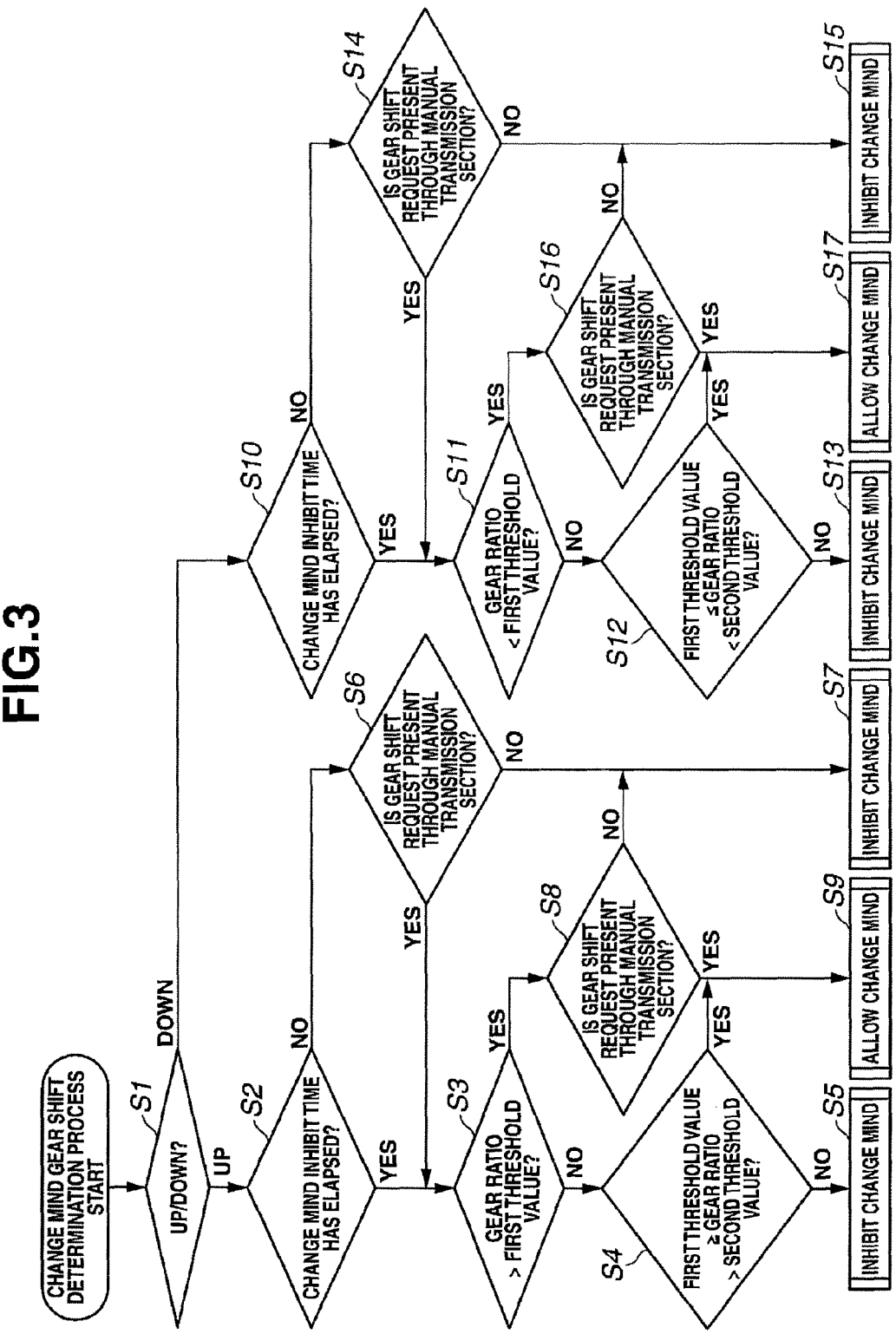

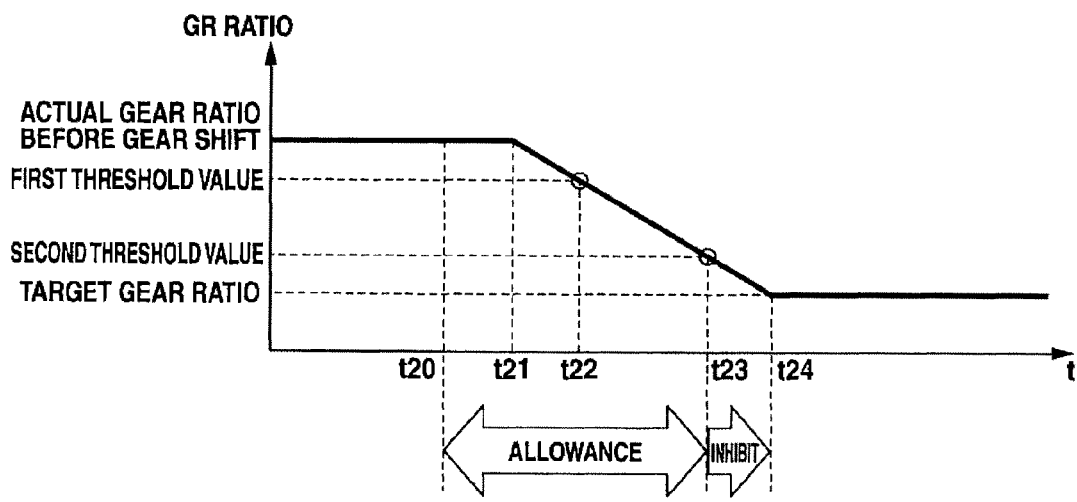
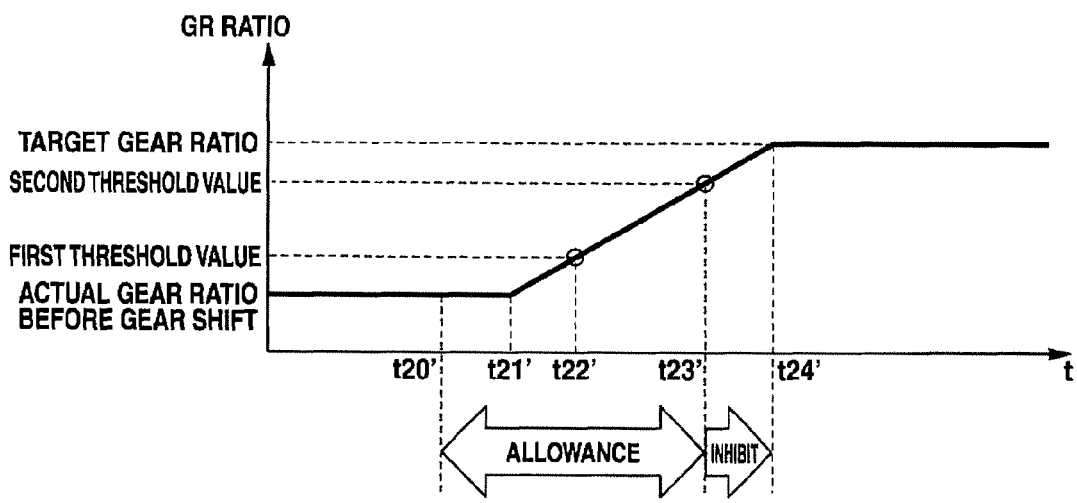

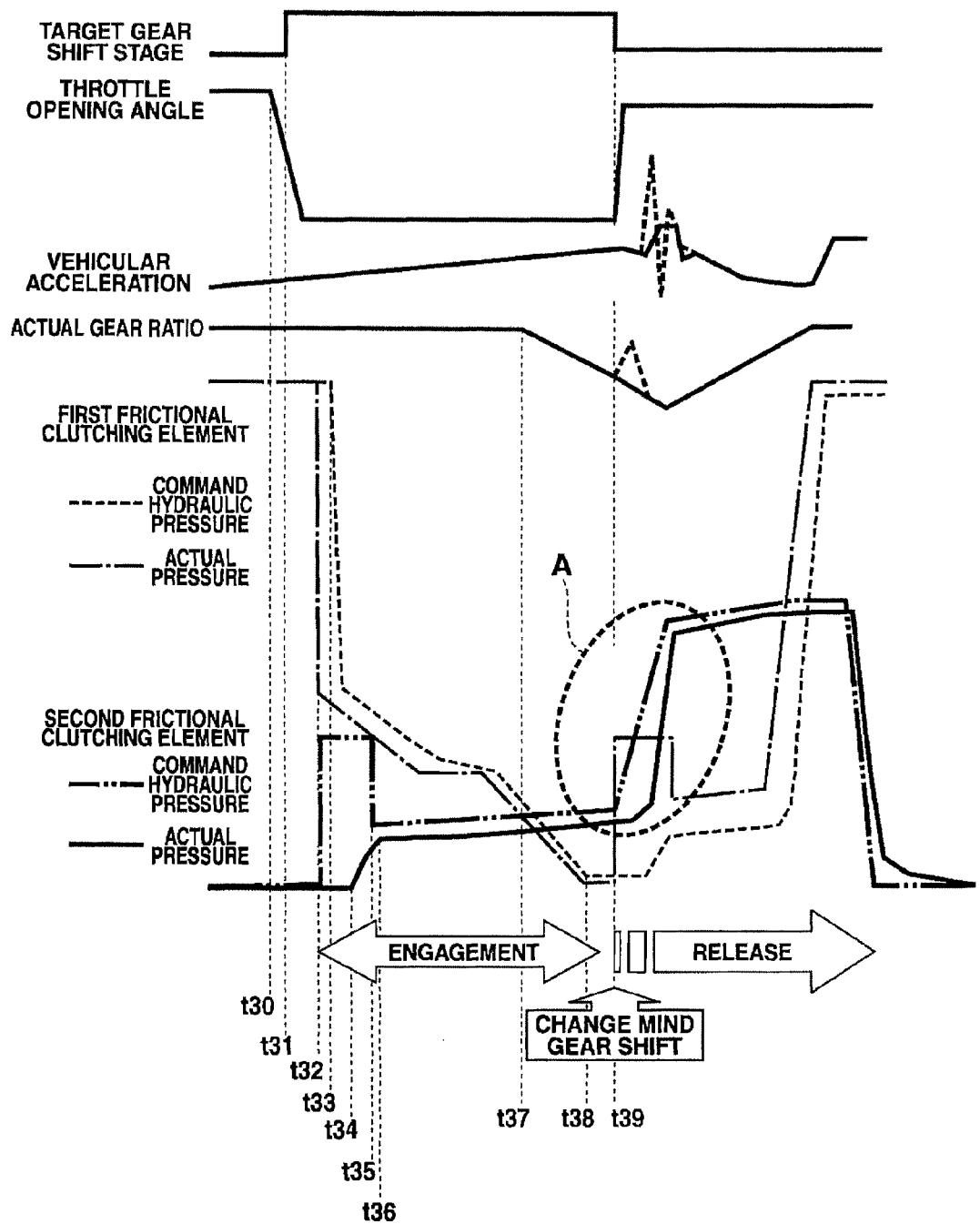

DEVICE FOR CONTROLLING AUTOMATIC TRANSMISSION

TECHNICAL FIELD

The present invention relates to a control apparatus for an automatic transmission in which manual shift means for executing a gear shift to a gear shift stage set through a manual operation is equipped.

BACKGROUND ART

Recently, many automatic transmissions have multiple number of gear shift stages. Then, number of frictional clutching elements such as clutches and brakes are increased in accordance with the increase in the number of gear shift stages. In addition, as the number of the gear shift stages are increased, intervals between gear shift lines of a shift map become remarkably dense. Hence, the gear shift is easy to occur due to a slight change in a traveling condition (for example, a throttle opening angle or so forth). That is to say, a frequency of the occurrence of the gear shift is increased so that such a scene that a request to modify a target gear shift stage even while the gear shift occurs is increased.
Therefore, as a conventional technique, in a case where the modification request occurs during the gear shift as described above, such a control apparatus for the automatic transmission that the modification of the target gear shift stage is allowed in a case where the modification request of the target gear shift stage occurs due to the change in the traveling condition at a time from a determination of the gear shift to a start of an actual gear shift, namely, until the start of an inertia phase and, after the start of the inertia phase, the modification of the target gear shift stage is inhibited to complete the gear shift during the gear shift is described in a Patent Document 1.

However, since, in the conventional control apparatus for the automatic transmission, the modification of the target gear shift stage or, so-called, a change mind gear shift is allowed if the modification of the target gear shift is before the start of the inertia phase, a shock and an engine racing are often generated.
That is to say, it is difficult to accurately detect a return quantity of a piston stroke under a release control and a clutch capacity in the frictional clutching element. Therefore, in the frictional clutching element in which control is changed from a release control to an engagement control according to the execution of the change mind gear shift, an actual piston return quantity or the clutch capacity are smaller than the detected piston return quantity or clutch capacity (the piston stroke is not returned from a supposed return quantity), an abrupt engagement is resulted and the shock is generated.
In addition, when the actual piston return quantity or the actual clutch quantity is larger than the detected piston return quantity or the clutch capacity, an engagement delay occurs and the engine racing is generated.

PRE-PUBLISHED DOCUMENT

Patent Document 1: Japanese Patent Application First Publication (tokkai) No. Heisei 6-34659

DISCLOSURE OF THE INVENTION

With the above-described problem in mind, it is an object of the present invention to provide a control apparatus for an automatic transmission which is capable of executing a gear shift control in accordance with an intention of a vehicle driver while generations of the shock and the engine racing are prevented.

In order to achieve the above-described object, according to the present invention, there is provided a control apparatus for an automatic transmission in which a first frictional clutching element which is engaged at a first gear shift stage and which is released at a second gear shift stage is equipped, the control apparatus comprising: automatic transmission means for executing a gear shift to a gear shift stage automatically set on a basis of a traveling state; manual transmission means for executing the gear shift to the gear shift stage set through a manual operation; inertia phase determining means for determining a start of an inertia phase during the gear shift from the first gear shift stage to the second gear shift stage; and change mind gear shift determining means for inhibiting the gear shift from the second gear shift stage to the first gear shift stage and continuing the gear shift from the first gear shift stage to the second gear shift stage, when, during the gear shift from the first gear shift stage to the second gear shift stage, a request of the gear shift from the second gear shift stage to the first gear shift stage by means of the automatic transmission means has occurred before the start of the inertia phase and suspending the gear shift from the first gear shift stage to the second gear shift stage and allowing the gear shift from the second gear shift stage to the first gear shift stage, when, during the gear shift from the first gear shift stage to the second gear shift stage, another request of the gear shift from the second gear shift stage to the first gear shift stage by means of the manual transmission means has occurred before the start of the inertia phase.

Thus, in the control apparatus for the automatic transmission, when, during the gear shift from the first gear shift stage to the second gear shift stage, the request of the gear shift from the second gear shift stage to the first gear shift stage by the automatic transmission has occurred before the start of the inertia phase, the gear shift from the first gear shift stage to the second gear shift stage is continued. On the other hand, when the gear shift request from the second gear shift stage to the first gear shift stage occurs by the manual transmission means, the gear shift from the first gear shift stage to the second gear shift stage is suspended and the gear shift from the second gear shift stage to the first gear shift stage is executed.
That is to say, during the gear shift from the first gear shift stage to the second gear shift stage, the first fictional clutching element which is engaged at the first gear shift stage and is released at the second gear shift stage is controlled from the engagement state to the release state. However, it is difficult to detect the release state in the first frictional clutching element before the inertia phase start under this gear shift. Therefore, even if the gear shift from the second gear shift stage to the first gear shift stage by the automatic transmission means occurs, this gear shift request is not executed but the gear shift from the first gear shift stage to the second gear shift stage which is already being carried out is continued. Thus, the shock and the engine racing can be prevented from occurring. On the other hand, the gear shift request by the manual transmission means is caused by an intention of the vehicle driver. Therefore, when the gear shift request from the second gear shift stage to the first gear shift stage by the manual transmission means occurs, the gear shift from the second gear shift stage to the first gear shift stage is executed in response to this gear shift request. Thus, the gear shift control in accordance with the intention of the driver can be achieved.

Consequently, while the generations of the shock and the racing are prevented, the gear shift control in accordance with the intention of the driver can be executed.

BRIEF DESCRIPTION OF THE DRAWINGS

FIG. 3 is a flowchart representing a flow of a change mind gear shift determination process executed in an AT controller in the preferred embodiment.

FIGS. 6(a) and 6(b) are explanatory views of the gear ration in the control apparatus for the automatic transmission in the preferred embodiment and the allowance or the inhibit of the change mind gear shift request by means of a manual transmission section in the preferred embodiment, FIG. 6(a) being during the up-shift and FIG. 6(b) being during the down-shift.

FIG. 7 is a timing chart representing each characteristic of a target gear ratio, a throttle opening angle, a vehicular acceleration, an actual gear ratio, a command hydraulic pressure in a first frictional clutching element and an actual hydraulic pressure thereof, and a command hydraulic pressure in a second frictional clutching element and an actual hydraulic pressure thereof.

EMBODIMENT FOR CARRYING OUT THE INVENTION

Hereinafter, preferred embodiments of a control apparatus for an automatic transmission according to the present invention will be described on a basis of the attached drawings.
Embodiment 1

Figure 1:
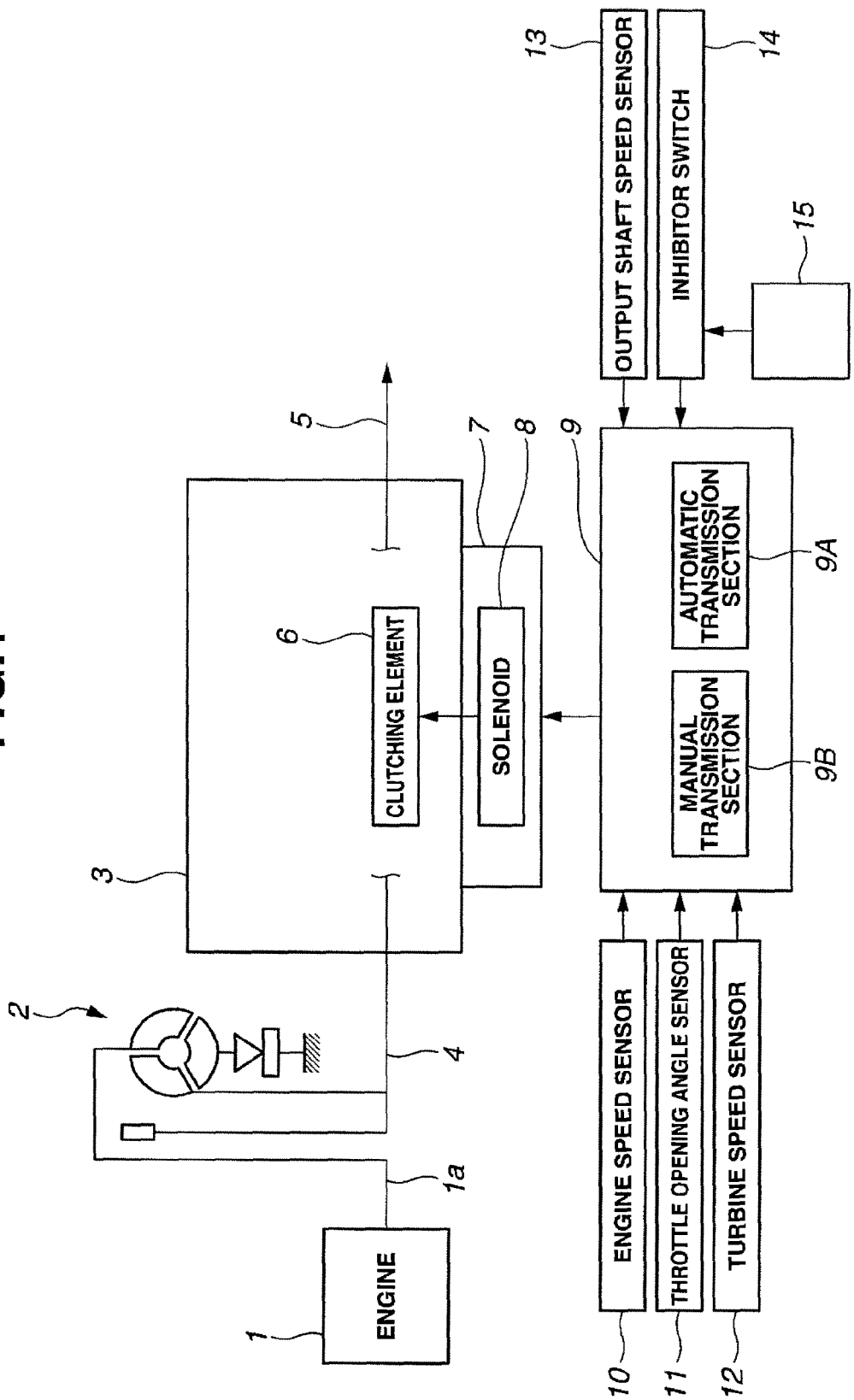
FIG. 1 is a whole system configuration view representing a structure of a vehicular power train to which a control apparatus for an automatic transmission in a preferred embodiment according to the present invention is applicable.
Figure 2:
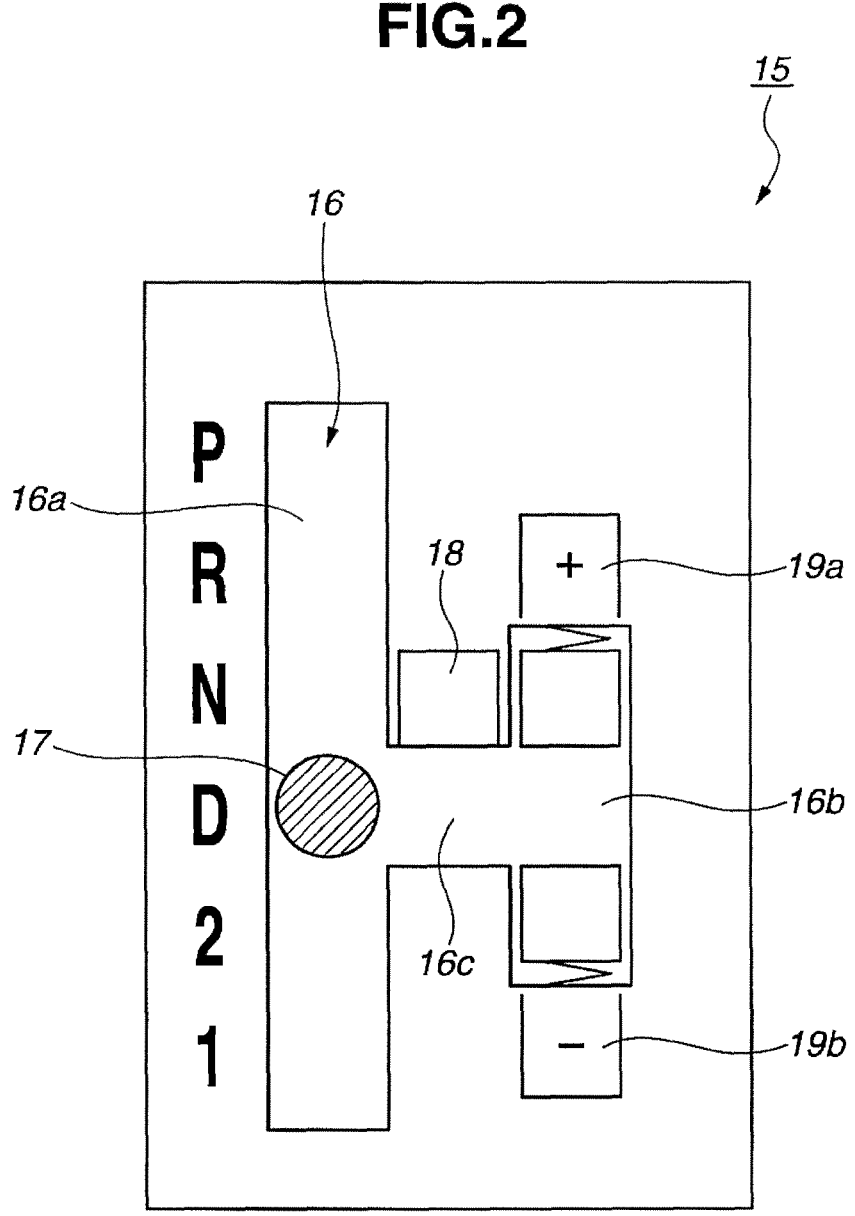
FIG. 2 is a plan view representing an operation section of a shift selection mechanism in the preferred embodiment according to the present invention.

First, a structure of the first embodiment will be described below.
Explanations of the structure of the control apparatus for the automatic transmission in the preferred embodiment according to the present invention are divided into "whole system configuration" and "a structure of a change mind gear shift determination process".
[Whole System Configuration]
FIG. 1 shows a whole system configuration view of a structure of a power train of a vehicle to which a control apparatus for the automatic transmission in a first preferred embodiment is applicable. FIG. 2 is a plan view representing an operation (manipulation) section of a shift selection mechanism in the first embodiment.

The power train in the first embodiment includes: an engine 1; a torque converter 2; and an automatic transmission, as shown in FIG. 1.

Engine 1 is a gasoline engine or diesel engine. An output power of engine 1 is adjusted by means of a throttle valve whose opening angle is increased from a full closure state to a full open state in accordance with a depression of an accelerator pedal on which a vehicle driver manipulates. An output shaft 1a of engine 1 is connected to an input shaft 4 of an automatic transmission 3 via a torque converter 2.

Automatic transmission 3 is a stepwise automatic transmission. This automatic transmission 3 includes: a front planetary gear set (not shown) disposed between input shaft 4 and output shaft 5, these shafts being arranged coaxially; a rear planetary gear set (not shown) disposed between input shaft 4 and output shaft 5, these shafts being arranged coaxially; a plurality of frictional clutching elements 6; and a valve body 7.

The plurality of frictional clutching elements 6 are operated in response to a hydraulic pressure and switch respective power transmission passages according to a combination of the engagement and release of frictional elements 6 to achieve a desired shift stage. The engagement, slip engagement, and release of each frictional clutching element 6 are controlled by means of a controlled hydraulic pressure generated by means of valve body 7 on a basis of control commands from an AT controller 9.

The plurality of frictional clutching elements 6 include: a first frictional clutching element which is at least engaged at a first shift stage and is released at a second shift stage; and a second clutching element which is released at the first shift stage and is clutched at the second shift stage.

It should be noted that "first shift stage" and "second shift stage" are arbitrary shift stages. For example, the first shift stage and second shift stage indicate a first-speed stage and a second-speed stage, second-speed stage and fourth-speed stage, or second-speed stage and first-speed stage.

Then, for each frictional clutching element 6, for example, normally open wet-type multiple plate clutch or wet-type multiple plate clutch whose hydraulic fluid flow quantity and hydraulic pressure are continuously controlled by means of a proportional solenoid.

An oil passage (not shown) via which the hydraulic pressure is supplied to each frictional clutching element 6 is formed within valve body 7. A solenoid 8 driven on a basis of control commands inputted from AT controller 9 manipulates a pressure regulator valve (not shown) to control the hydraulic pressure of command pressure set by means of AT controller 9 to be supplied to a predetermined frictional clutching element 6. In addition, during the traveling of the vehicle, the hydraulic pressure is controlled in order for the hydraulic pressure to be supplied only for frictional clutching element 6 in order to achieve the desired gear shift stage.

AT controller 9 includes: an automatic transmission section (automatic transmission means) 9A; and a manual transmission section (manual transmission means) 9B.

Automatic transmission section 9A executes a gear shift toward a gear shift stage which is automatically set on a basis of a traveling state determined from a vehicle speed, an accelerator opening angle, and a throttle opening angle when a manual mode switch 18 is in an OFF controlled in a shift selection mechanism 15 connected to an inhibitor switch 14.

Manual transmission section 9B executes a gear shift to a gear shift stage which is set in shift selection mechanism 15 when manual mode switch 18 is in an ON controlled in shift selection mechanism 15 connected to inhibitor switch 14.

Furthermore, this AT controller 9 determines whether there is a request of "change mind gear shift" such that a gear shift control of returning a target shift stage to an original gear shift stage is carried out, before the target shift stage in a certain gear shift stage is achieved.

In other words, this AT controller 9 inhibits this change mind gear shift when there is the request of the gear shift from the first gear shift stage to the second gear shift stage by means of automatic transmission section 9A before a start of an inertia phase, during the gear shift from the first gear shift stage to the second gear shift stage. Thus, the gear shift from the second shift stage to the first shift stage is not executed but the gear shift from the first gear shift stage to the second gear shift stage is continued.

In addition, when, during the gear shift from the first gear shift stage to the second gear shift stage, before the start of the inertia phase, there is the request (change mind gear shift request) of the gear shift from the second gear shift stage to the first gear shift stage by means of manual transmission section 9B, this change mind gear shift is allowed. Thus, the gear shift from the first gear stage to the second gear shift is suspended and the gear shift from the second gear shift stage to the first gear shift stage is executed.

That is to say, this AT controller 9 inhibits the change mind gear shift by means of an automatic shift mode before the start of the inertia stage but the change mind gear shift by means of a manual shift mode is allowed.

Furthermore, this AT controller 9 determines a command pressure of a working hydraulic pressure supplied to the engaged frictional clutching element 6 on a basis of a gear shift control command commanded by means of each of transmission sections 9A, 9B and outputs of an engine speed sensor 10, a throttle opening angle sensor 11, a turbine speed sensor 12, an output shaft speed sensor 13, an inhibitor switch 14, and so forth. Thereafter, AT controller 9 outputs a command to drive solenoid 8 in order for the working hydraulic pressure of the determined command pressure to be supplied to frictional clutching element 6 to be engaged and outputs an exhaust command to exhaust the working oil from released frictional clutching element 6.

Engine speed sensor 10 detects a rotation of an output shaft of engine 1 and a signal representing a number of rotations of the detected output shaft (engine speed Ne) is outputted to AT controller 9.

Throttle opening angle sensor 11 detects an opening angle of a throttle valve of engine 1 and a signal representing the detected opening angle of throttle valve (a throttle opening angle Tvo) is outputted to AT controller 9. Turbine speed sensor 12 detects the rotation of input shaft 4 of automatic transmission 3 and the signal representing a number of rotations of input shaft 4 of automatic transmission 3 and outputs the signal representing the rotation speed of input shaft 4 (a turbine speed Nt) to AT controller 9.

Output shaft rotation (speed) sensor 13 detects the rotation of output shaft 5 of automatic transmission 3 and outputs the signal representing the number of rotations (output shaft speed No) of output shaft 5 to AT controller 9.

Inhibitor switch 14 is installed on a manual shaft (not shown) which is pivoted in association with a manipulation (operation) of shift selection mechanism 15. A signal representing a selected range of shift selection mechanism 15, an ON/OFF signal of manual mode switch 18, and so forth are outputted to AT controller 9.

A manipulation section of shift selection mechanism 15 is, for example, as shown in FIG. 2, moves a select lever 17 along with a guide passage 16 of a substantially H shape, as shown in FIG. 2, to select an arbitrary range.

That is to say, guide passage 16 includes: an automatic transmission purpose guide groove 16a in which ranges of an automatic transmission mode are arrayed in a column in a vehicular forward-or-backward direction; a communication groove 16c extended in a lateral direction from a drive range D position in automatic transmission purpose guide groove 16a; and a manual transmission purpose guide groove 16b communicated with communication groove 16c and extended in the vehicular forward-or-backward direction in parallel to automatic transmission purpose guide groove 16a. Then, an inhibitor switch 14 detects a range signal corresponding each range of the automatic transmission mode by moving select lever 17 on each range position of the automatic transmission mode. In addition, on a communication groove 16c, a manual mode switch 18 is arranged. This manual mode switch 18 is ON controlled when select lever 17 is moved from automatic transmission purpose guide groove 16a to manual transmission purpose guide groove 16b and is OFF controlled when select lever 17 is moved from manual transmission purpose guide groove 16b to automatic transmission purpose guide groove 16a.

This ON/OFF signal is detected by means of inhibitor switch 14.

A forward-or-backward position of an end section in an extended direction of manual transmission purpose guide groove 16b includes up-shift switch 19a and down-shift switch 19b. When select lever 17 moved to manual transmission purpose guide groove 16b is moved toward one of respective shift switches 19a, 19b and contacted, contacted either one of shift switches 19a, 19b is ON state and the gear shift stage is set and modified. This ON signal is detected by means of inhibitor switch 14.

[Structure of Change Mind Gear Shift Determination Process]

FIG. 3 shows a flowchart representing a flow of the change mind gear shift determination process executed by means of AT controller 9 in the first embodiment.

This change mind gear shift determination process (change mind gear shift determination means) is executed when the gear shift command from the first stage to the second stage is outputted. It should be noted that this first gear shift command may be the gear shift command by means of automatic transmission section 9A or may be the gear shift command by means of manual transmission section 9B. Hereinafter, each step shown in FIG. 3 will be described below.

At a step S1, AT controller 9 determines whether the outputted shift command from the first gear shift stage to the second gear shift stage is an up-shift (command) or down-shift (command). If AT controller 9 determines that the shift command from the outputted first stage to the outputted second stage is the up-shift, the routine goes to a step S2. If down-shift (No), the routine goes to a step S10.

It should herein be noted that the determination of the up-shift or the down-shift is as follows: That is to say, if a target gear ratio after the gear shift has a smaller value than an actual gear ratio before the gear shift, AT controller 9 determines that the up-shift occurs. If the target gear ratio after the gear shift has a larger value than the actual gear ratio before the gear shift, AT controller 9 determines that the down-shift occurs.

At a step S2, AT controller 9 determines whether "a change mind inhibit time" from the time at which the up-shift gear shift command is outputted after the determination of the up-shift at step S1 has elapsed. If YES (passage of an inhibit time), the routine goes to a step S3. If No (the inhibit time has not elapsed), the routine goes to a step S6.

It should, herein, be noted that "change mind inhibit time" is a time during which a piston stroke of frictional clutching element 6 (second frictional clutching element) has been completed which switches from a release control to an engagement control in response to the gear shift command from the first gear shift stage to the second shift gear stage, viz., a time during which a backlash reduction is completed according to a pre-charge hydraulic pressure supplied to second frictional element at the clutching side and is preset to an arbitrary time.

At a step S3, subsequent to the determination at step S2 that the change mind inhibit time has elapsed or subsequent to the determination at a step S6 at which the gear shift request according to manual transmission section 9B is present, AT controller 9 determines whether the gear ratio in automatic transmission is larger than a first threshold value. If YES (gear ratio>first threshold value), the routine goes to a step S8. If No (gear ratio≤first threshold value), the routine goes to a step S4. It should, is herein, be noted that the gear ratio described above is a ratio between turbine speed Nt detected by turbine speed sensor 12 and output shaft speed No detected by means of output shaft speed sensor 13.

It should also be noted that the first threshold value is a value by which a start of the inertia phase can be determined and is preset to an arbitrary value.

It should, furthermore, be noted that this step S3 corresponds to inertia phase determination means for determining the start of the inertia phase during the shift from the first gear shift stage to the second gear shift stage.

At step S4, subsequent to the determination at step S3 that gear ratio≤first threshold value, AT controller 9 determines whether the gear ratio in automatic transmission 3 is larger than a second threshold value.

If Yes (first threshold value≥gear ratio>second threshold value), the routine goes to a step S9. If No (gear ratio≥gear ratio>second threshold value), the routine goes to a step S9. If No (gear ratio≤second threshold value), the routine goes to a step S5.

It should, herein, be noted that the second threshold value is a value by which the gear shift from the first gear shift stage to the second gear shift stage has substantially been completed and is preset to an arbitrary value.

At step S5, AT controller 9 inhibits the change mind gear shift upon determination that the gear shift from the first gear shift stage to the second gear shift stage is substantially finished, subsequent to the determination that gear ratio≤first threshold value. Thus, the gear shift from the first gear shift stage to the second gear shift stage is continued even if the gear shift from the second gear shift stage to the first gear shift stage is commanded from either automatic transmission section 9A or manual transmission section 9B. Thus, the present gear shift control is finished.

At step S6, subsequent to the determination at step S2 that the change mind inhibit time has not been elapsed, AT controller 9 determines whether the request of the gear shift from the second gear shift stage to the first gear shift is outputted. If Yes (the gear shift request occurs), the routine goes to a step S3. If No (no gear shift request occurs), the routine goes to a step S7.

It should be noted that the presence or absence of the gear shift request by means of manual transmission section 9B is determined according to the output of inhibitor switch 14. That is to say, if manual mode switch 18 is ON controlled in shift selection mechanism 15 and a set modification command of the shift stage from the second gear shift stage to the first gear shift stage is outputted in shift selection mechanism 15, At controller 9 determines that the gear shift request has occurred by means of manual transmission section 9B.

At a step S7, subsequent to the determination at step S6 that the gear shift by means of manual transmission section 9B does not occur or subsequent to the determination at step S8 that the gear shift request by means of manual transmission section 9B does not occur, AT controller 9 inhibits the change mind gear shift.

Thus, even if the gear shift from the second gear shift stage to the first gear shift stage is issued from automatic transmission section 9A, the gear shift from the first gear shift stage to the second gear shift stage is continued. In other words, in order for the routine to go to step S7, either a case where during the issuance of the gear shift command from the first gear shift stage to the second gear shift stage, the piston stroke of engaged side frictional clutching element 6 (second frictional clutching element) is not completed during the gear shift command from the first gear shift stage to the second gear shift stage and no gear shift request is not outputted from manual gear shift section 9B or a case where, during the gear shift command from the first gear shift stage to the second gear shift stage, the piston stroke of the engaged side frictional clutching element 6 (second frictional clutching element) has been completed but before the inertia phase is started and the gear shift request from manual transmission section 9B is not outputted.

At a step S8, subsequent to the determination at step S3 that gear ratio>first threshold value, AT controller 9 determines whether the gear shift request from the second gear shift stage to the first gear shift stage by means of manual transmission section 9B occurs. If Yes (the gear shift request occurs), the routine goes to a step S9. If No (gear shift request does not occur), the routine goes to step S7.

It should be noted that the determination of whether the gear shift request occurs or does not occur by means of manual transmission section 9B is carried out in the same way as step S6.

At a step S9, subsequent to the determination at step S8 that the gear shift request occurs by means of manual transmission section 9B or subsequent to the determination at step S4 that first threshold value gear ratio>second threshold value, AT controller 9 allows the change mind gear shift.

Thus, when the gear shift request from the second gear shift stage to the first gear shift stage from either automatic transmission section 9A or manual transmission section 9B occurs, AT controller 9 suspends the gear shift from the first gear shift stage to the second gear shift stage and executes the gear shift from the second gear shift stage to the first bear shift stage.

At step S10, subsequent to the determination at step S1 that the down shift occurs, AT controller 9 determines whether a change mind inhibit time is elapsed from the time at which the downshift command is outputted. If Yes (the passage of the inhibit time), the routine goes to a step S11. If No (no passage of the inhibit time), the routine goes to a step S14.

It should, herein, be noted that the change mind inhibit time means a time at which a piston stroke of the frictional clutching element 6 (second frictional clutching element) switched from the release control to the engagement control in response to the gear shift command from the first shift gear stage to the second gear shift stage has been completed, viz., the backlash reduction according to the pre-charge hydraulic pressure supplied to the second frictional clutching element has been completed and is preset to an arbitrary time.

At a step S11, AT controller 9 determines whether a gear ratio in automatic transmission 3 is smaller than a first threshold value subsequent to the determination that the gear shift request occurs by means of manual transmission section 9B at step S14.

If Yes (gear ratio<first threshold value), the routine goes to a step S16. If No (gear ratio≥first threshold value), the routine goes to a step S12.

It should, herein, be noted that the gear ratio means a ratio between turbine (revolution) speed Nt detected by means of turbine speed sensor 12 and output shaft (revolution) speed No detected by means of output shaft revolution (speed) sensor 13.

In addition, it should be noted that the first threshold value means a value by which the start of the inertia phase can be determined and is preset to the arbitrary value. It should be noted that this step S11 corresponds to inertia phase determining means for determining the start of the inertia phase during the gear shift from the first gear shift stage to the second gear shift stage.

At step S12, subsequent to the determination at step S11 that the gear ratio≥first threshold value, AT controller 9 determines whether the gear ratio in automatic transmission 3 is smaller than a second threshold value.

If Yes (first threshold value≤gear ratio<second threshold value), the routine goes to a step S17. If No (gear ratio≥second threshold value), the routine goes to a step S13.

It should, herein, be noted that the second threshold value means a value by which AT controller 9 can determine that the gear shift from the first gear shift stage to the second gear shift stage is substantially completed and is preset to an arbitrary value.

At step S13, subsequent to the determination at step S12 that gear ratio≥second threshold value, AT controller 9 determines that the gear shift from the first gear stage to the second gear shift stage has almost been completed and inhibits the change mind gear shift. Thus, even if the gear shift from the second gear shift stage to the first gear shift stage is commanded from either automatic transmission section 9A or manual transmission section 9B, the gear shift from the first gear shift stage to the second gear shift stage is continued and this gear shift control is ended.

At step S14, AT controller 9 determines whether the gear shift command from the second gear shift stage to the first gear shift stage is outputted subsequent to the determination at step S10 that the change mind inhibit time is not elapsed. If Yes (the gear shift command is outputted), the routine goes to a step S11. If No (no gear shift command is outputted), the routine goes to a step S15.

It should, herein, be noted that the presence or absence of the gear shift command by means of manual transmission section 9B is determined from the output of inhibitor switch 14. That is to say, if manual mode switch 18 is in an ON control in shift selection mechanism 15 and the set modification of the gear shift stage from the second gear shift stage to the first gear shift stage is commanded, AT controller 9 determines that the gear shift command by means of manual transmission section 9B has been carried out.

At step S15, subsequent to the determination at step S14 that no gear shift command by means of manual transmission section 9B or subsequent to the determination at step S16 that the gear shift command by means of the manual transmission section is not present, AT controller 9 inhibits the change mind gear shift.

Therefore, even if the gear shift from the second gear shift stage to the first gear shift stage is commanded from automatic transmission section 9A, the gear shift from the first gear shift stage to the second gear shift stage is continued.

In other words, in order for the routine to go to step S15, such a case where, during the gear shift command from the first gear shift stage to the second gear shift stage, the piston stroke of the engaged side frictional clutching element 6 (second frictional clutching element) is not yet completed and the gear shift request from manual transmission section 9B is not outputted or such a case where, during the gear shift command from the first gear shift stage to the second gear shift stage, the piston stroke of the engaged side frictional clutching element 6 (second frictional clutching element) is completed but it is before the inertia phase is started and the gear shift request from manual transmission section 9B is not outputted is applied.

At step S16, subsequent to the determination at step S11 that gear ratio<first threshold value, AT controller 9 determines whether the gear shift request from the second gear shift stage to the first gear shift stage is outputted by means of manual transmission section 9B. If Yes (the gear shift request is outputted), the routine goes to step S17 and if No (the gear shift request is not outputted), the routine goes to step S15. The determination of the presence or absence of manual transmission section 9B is carried out in the same way as step S14.

At step S17, AT controller 9 allows the change mind gear shift subsequent to the determination at step S16 that the gear shift request is present by means of manual gear shift request 9B or subsequent to the determination at step S12 that first threshold value≤gear ratio<second threshold value.

Thus, if the gear shift from either automatic transmission section 9A or manual transmission section 9B is requested, AT controller 9 suspends the gear shift from the first gear shift stage to the second gear shift stage and executes the gear shift from the second gear shift stage to the first gear shift stage.

Next, the action will be explained.

First, [Structure and task of the control apparatus for the automatic transmission in a comparative example] will be described. Thereafter, the explanations of actions of the control apparatus for the automatic transmission in the first embodiment are divided into [Limitation action of the change mind gear shift by means of the automatic transmission section], [Limitation action of change mind gear shift by means of the manual transmission section], and [Time limitation action of the change mind gear shift].

[Structure and Task of the Control Apparatus for the Automatic Transmission in the Comparative Example]

Figure 4A:
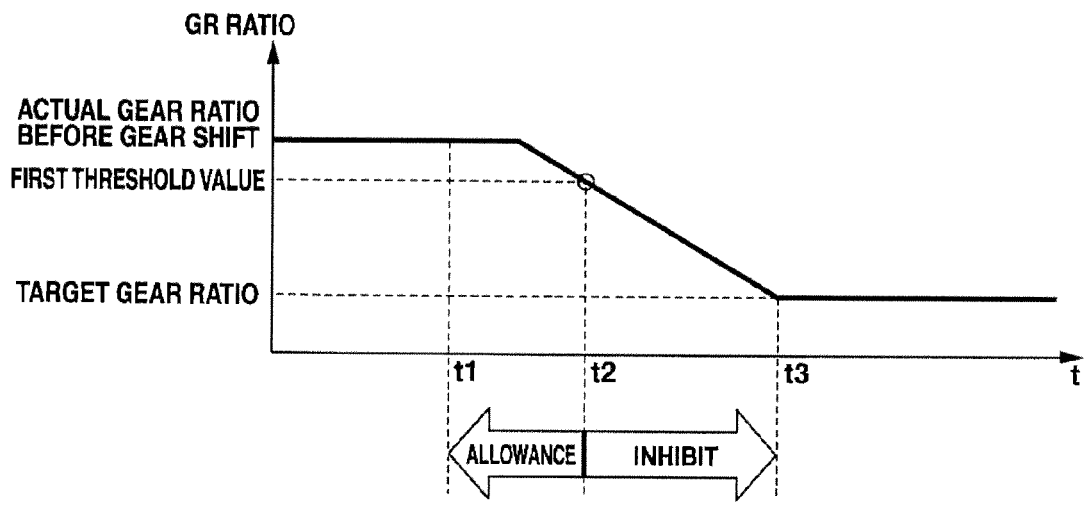
FIGS. 4(a) and 4(b) are explanatory views of a gear ratio in the control apparatus for the automatic transmission in a comparative example and an allowance or an inhibit of a change mind gear shift request in the comparative example, FIG. 4(a) being during an up-shift and FIG. 4(b) being during a down-shift.
Figure 4B:
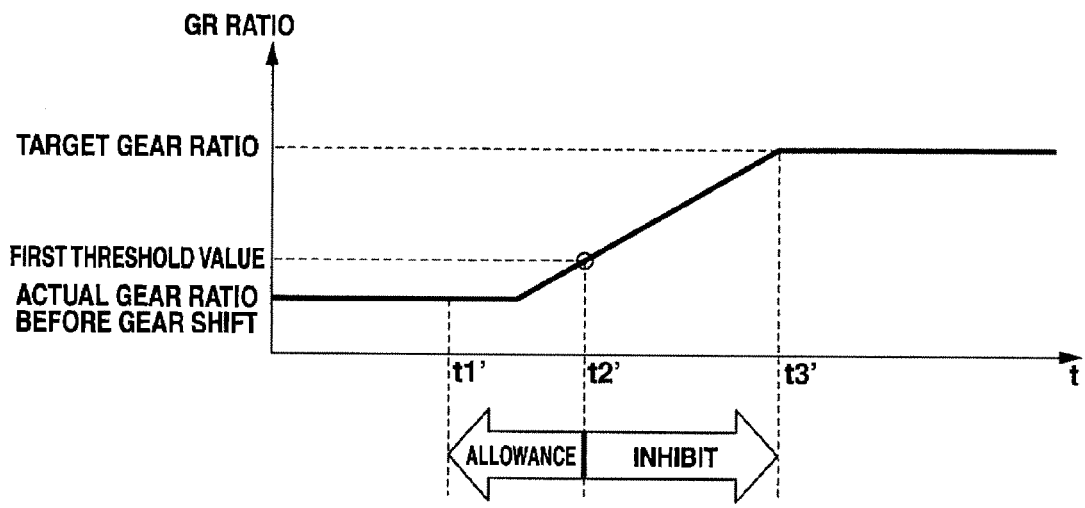

FIGS. 4(a) and 4(b) are explanatory views representing a gear ratio and a presence or absence of the change mind gear shift request in the control apparatus for the automatic transmission and FIG. 4(a) shows the up-shift and FIG. 4(b) shows the down-shift.

In the automatic transmission, when the up-shift gear shift command is outputted, as shown in FIG. 4(a), a target gear ratio is set to a small value with respect to the actual gear ratio before the gear shift. In addition, when the downshift gear shift command is outputted, the target gear ratio is set to a large value with respect to the actual gear ratio before the gear shift, as shown in FIG. 4(b).

Then, when a predetermined time has elapsed from a time (time t1, time t1') at which the gear shift command is outputted in an either case of the up-shift gear shift or of the down-shift gear shift, the gear ratio is started to be gradually varied and is reached to the target gear ratio at time t3 or time t3' so that the gear shift control is ended.

At this time, the control apparatus for the automatic transmission in the comparative example sets the first threshold value as the gear ratio by which the control apparatus can determine the start of the inertia phase, after the gear ratio is started to be varied.

Then, until the actual gear ratio reaches to the first threshold value, namely, until the inertia phase during the gear shift control is started, the change mind gear shift is allowed. However, after the start of the inertia phase, the change mind gear shift request is inhibited.

Thus, in a case where, during a time duration from time t1 to time t2 or during the time duration from time t1' to time t2', the target gear shift stage is modified to the original gear shift stage due to a change in a traveling condition, the modification of the target gear shift stage is allowed.

On the other hand, in a case where, during a time from time point t2 to time point t3 or during a time from time point t2' to time point t3', the target gear shift stage is modified to the original gear shift stage due to the change in the traveling condition or so forth, the modification of the target gear shift stage is inhibited and the execution of the gear shift control now currently carried out is continued.

That is to say, in the control apparatus for the automatic transmission of the comparative example, the control apparatus determines whether the change mind gear shift request is outputted with a start timing (time t2, time t2') as a reference. Therefore, in a midway through the change from the engaged state to the released state in response to the first gear shift command, in the frictional clutching element which undergoes an again engagement control according to the change mind gear shift, a piston returning quantity cannot be grasped under the release control. Thus, a shock or a high rpm-idling of engine (an engine racing) is often generated.

That is to say, before the start of the inertia phase, the frictional clutching element which is varied from the engaged state to the released state in response to the first gear shift command is not completely released. Therefore, this frictional clutching element is, so called, a semi-engaged state. In this state, the frictional clutching element is again under an engagement control by means of the change mind gear shift. At this time, in a case where the actual piston returning quantity is smaller than the detected piston returning quantity (a case where the piston stroke is not yet returned), an abrupt engagement occurs so that the shock occurs. In addition, in a case where the actual piston returning quantity is larger than the detected piston return quantity (a case where the piston stroke is returned), an engagement delay occurs so that the engine high-rpm idling (racing) is developed.

Whereas, the execution of the gear shift control by means of the manual operation is an intention of the vehicle driver. Hence, if the change mind gear shift is inhibited after the start of the inertia phase, the gear shift control in accordance with the intention of the vehicle driver cannot be obtained and an unpleasant feeling is given to the driver.

[Limitation Action of the Change Mind Gear Shift by Means of the Automatic Transmission Section]

Figure 5A:
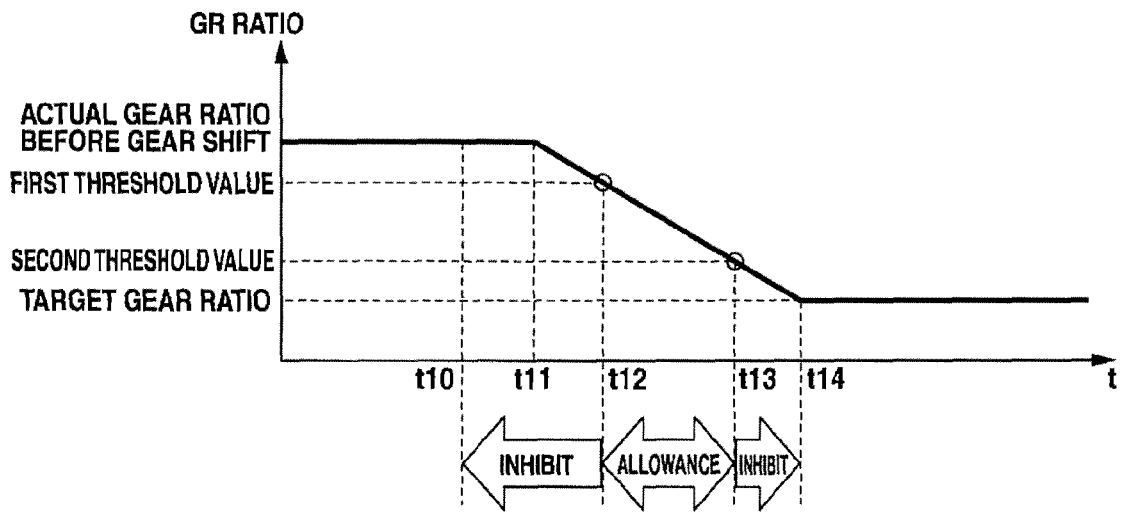
FIGS. 5(a) and 5(b) are explanatory views of the gear ratio in the control apparatus for the automatic transmission in the preferred embodiment and the allowance or the inhibit of the change mind gear shift request by means of an automatic transmission section in the preferred embodiment, FIG. 5(a) being during the up-shift and FIG. 4(b) being during the down-shift.
Figure 5B:
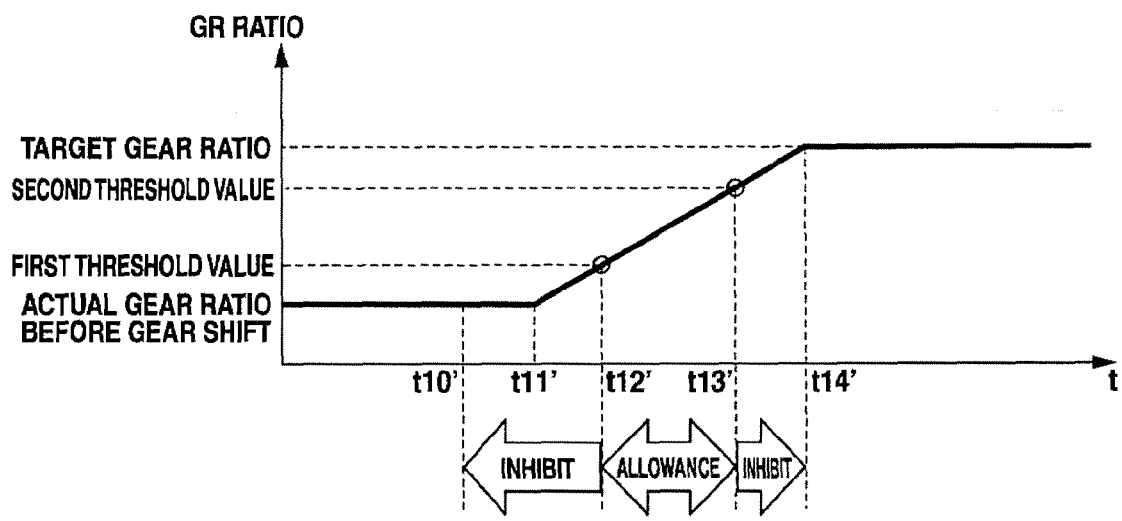

FIGS. 5(a) and 5(b) show the explanatory views representing the gear ratio and the change mind gear shift request by the automatic transmission section in the control apparatus for the automatic transmission in the first embodiment, FIG. 5(a) showing the up-shift thereof and FIG. 5(b) showing the down-shift thereof.

(Up-Shift of the Gear Shift)

When the driver releases the accelerator pedal of the vehicle and the gear shift command of the up-shift is outputted at a time t10 in FIG. 5(a), the target gear ratio is set to a smaller value as compared with the actual gear ratio before the gear shift. Thus, appropriate engagement control and release control for plurality of frictional clutching elements 6 of automatic transmission 3 are performed. At a time t11, the actual gear ration is started to be reduced gradually toward the target gear ratio.

Then, at a time t12, when the actual gear ratio is reduced and below the first threshold value, one of frictional clutching elements 6 of automatic transmission 3 which is release controlled (first frictional clutching element) is completely released and the inertia phase can be determined to be started in the up-shift.

Furthermore, at a time t13, the actual gear ratio is reduced and below the second threshold value. At this time, the substantial end of the up-shift can be determined. Then, at a time t14, the actual gear ratio reaches the target gear ratio, one of plurality of frictional elements 6 (second frictional clutching element) which is engagement controlled is completely engaged and the up-shift (gear shift) is ended.

Suppose a case where, under such an up-shift (gear shift) as described above, the change mind gear shift request from automatic transmission section 9A is issued.

(1) Occurrence of the change mind gear shift request between time t10 and time t12

In a case where the request of the change mind gear shift from automatic transmission section 9A between time t10 and time t12 shown in FIG. 5(a), the routine shown in the flowchart of FIG. 3 goes from step S1 to step S2. If the change mind inhibit time has elapsed, the routine goes to step S3.

Before time t12, the actual gear ratio is in excess of the first threshold value and the determination that the inertia phase during the up-shift (gear shift) is not started is made. Therefore, the routine goes from step S3 to step S8. At this time, the request of the change mind gear shift from automatic transmission section 9A is outputted and the gear shift request by means of manual transmission section 9B is not outputted. Thus, the routine goes from step S8 to step S7 and the change mind gear shift is inhibited.

Consequently, the change mind gear shift request by means of automatic transmission 9A is inhibited and the up-shift gear shift which is an initial gear shift command is continued.

It should be noted that the frictional clutching element (first frictional clutching element) which changes from the engagement state to the released state according to the up-shift gear shift is not completely released if the time is before the inertia phase start in the up-shift gear shift. However, since the up-shift gear shift is continued, this frictional clutching element (first frictional clutching element) is not again engagement controlled.

Even if the piston returning quantity cannot be detected with a high accuracy, the engagement control is not carried out. Thus, an abrupt engagement and engagement delay are not developed so that the generation of the shock and the engine high-rpm idling (racing) can be prevented.

(2) Occurrence of the change mind gear shift request at a time duration from time t12 to time t13

In a case where the request of change mind gear shift is issued from automatic transmission 9A at a time duration between time t12 and time t13, in the flowchart of FIG. 3, the routine goes from step S1 to step S2. Then, since the change mind inhibit time has been elapsed, the routine goes to step S3.

After time t12, the actual gear ratio is below the first threshold value. The determination that the inertia phase during the up-shift gear shift has started is made. Hence, the routine goes from step S3 to step S4.

Then, before time t13, the actual gear ratio is above the second threshold value and the determination is made that the up-shift gear shift is in progress. Thus, the routine goes from step S4 to step S9 and the change mind gear shift is allowed. Thus, the change mind gear shift request by means of automatic transmission section 9A is allowed. The up-shift gear shift which is the initial gear shift command is suspended and the change mind gear shift such that the target gear shift ratio is the gear ratio before the gear shift occurs is executed.

It should be noted that, if the inertia phase during the up-shift gear shift is started, the frictional clutching element (first frictional clutching element) which varies from the engagement state to the release state according to the up-shift gear shift is completely released. Therefore, even if this frictional clutching element (first frictional clutching element) is again in the engagement control, the engagement control is carried out in a position at which the piston stroke is completely returned. Thus, a stroke management of the piston can be carried out with high accuracy.

Consequently, developments of the abrupt engagement and the engagement delay are suppressed, the change mind gear shift is executed while the shock and the engine high-rpm idling (racing) are prevented from occurring, and the gear shift control to conform to the traveling state can be carried out.

(3) Occurrence of change mind request at time t13 through time t14.

In a case where the request of the change mind gear shift is issued from automatic transmission section 9A between times t13 and t14 in FIG. 5(a), in the flowchart of FIG. 3, the routine goes from step S1 to step S2. In this case, since the change mind inhibit time has been elapsed, the routine goes to step S3.

Since the time is after time t13, the actual gear ratio is below the first threshold value and the routine goes from step S3 to step S4.

However, after time t13, the actual gear ratio is below the second threshold value and the determination is made that the up-shift gear shift is substantially ended. Therefore, the routine goes from step S4 to step S5 and the change mind gear shift is inhibited.

Thus, the change mind gear request by means of automatic transmission section 9A is inhibited and the up-shift gear shift which is the initial gear shift command is continued.

It should be noted that, if the up-shift gear shift is substantially in the complete state, the frictional clutching element (second frictional clutching element) which is varied from the released state to the engagement state according to the up-shift gear shift is almost in the engagement state.

Therefore, if the change mind gear shift is allowed in such a state as described above, the control commands become complicated, an engagement hydraulic pressure state becomes unstable, and the shock is often developed. Whereas, since the up-shift gear shift is continued, this frictional clutching element (second frictional clutching element) is not again release controlled and the engagement hydraulic pressure state does not become unstable. Consequently, the control commands do not become complicated and the generation of the shock can be prevented.

(Down-Shift Gear Shift)

When the vehicle driver depresses the accelerator pedal so that a demanded driving force is raised, a gear shift command of the down-shift is outputted at a time t10' in FIG. 5(a). Thus, as shown in FIG. 5(b), the target gear ratio is set to a large value as compared with the actual gear ratio before the gear shift. Then, appropriate engagement and release control are carried out for a plurality of frictional clutching elements 6 of automatic transmission 3. Then, at time t11', the actual gear ratio is started to gradually be raised toward the target gear ratio.

Then, when the actual gear ratio becomes in excess of the first threshold value, one of the plurality of frictional clutching elements 6 of automatic transmission 3 which is in the release control (first frictional clutching element) is completely released and the inertia phase at the down-shift of the gear shift can be determined to be started. Furthermore, at time t13', when the actual gear ratio becomes in excess of the target gear ratio, the gear shift can be determined to substantially be completed.

Then, at a time t14', when the actual gear ratio reaches to the target gear ratio, one of the plurality of frictional clutching elements of automatic transmission 3 which is engagement controlled is completely engaged and the down-shift (of the) gear shift is ended.

Suppose a case such that, during the down-shift of the gear shift, the request of the change mind gear shift from automatic transmission section 9A occurs.

(1) Occurrence of Change Mind Request at a Time Duration Between Times t10' and t12'.

In a case where the change mind gear shift occurs from automatic transmission section 9A between times t10' and t12' in FIG. 5(b), in the flowchart of FIG. 3, the routine goes from step S1 to step S10. If the change mind inhibit time has elapsed, the routine goes to step S11.

Before time t12', the actual gear ratio is below the first threshold value and the determination is made that the inertia phase during the down-shift gear shift is not started. Therefore, the routine goes from step S11 to step S16. At this time, since the change mind gear shift request by means of automatic transmission section 9A is issued and the gear shift request by means of manual transmission section 9B does not occur. Thus, the routine goes from step S16 to step S15 so that the change mind gear shift is inhibited. Thus, the change mind request is inhibited and the down-shift of the gear shift which is the initial gear shift command is continued.

It should be noted that, at a time duration before the inertia phase start during the down-shift of the gear shift, the frictional clutching element (first frictional clutching element) which is varied from the engaged state to the released state due to the down-shift according to the down-shift of the gear shift is not perfectly released.

However, the down-shift gear shift is continued so that this frictional clutching element (first frictional element) is not engagement controlled since the down-shift of the gear shift is continued.

Therefore, although the piston returning quantity can be detected with high accuracy, the engagement control is not carried out. Hence, no abrupt engagement and no delay in the engagement can be developed and the shock and the engine high-rpm idling (racing) can be prevented.

(2) Occurrence of the Change Mind Request at a Time Between Times t12' and t13'

In a case where the change mind gear shift from automatic transmission section 9A occurs at a time duration between times t12' and t13', in the flowchart of FIG. 3, the routine goes from step S1 to step S10. Since the change mind inhibit time has elapsed, the routine goes to step S11.

After time t12', the actual gear ratio is equal to or larger than the first threshold value and the determination that the inertia phase during the down-shift of the gear shift is started is made. Therefore, the routine goes from step S11 to step S12.

Then, at a time before time t13', the actual gear ratio becomes below the second threshold value and the determination that the down-shift gear shift is in progress is made. Thus, the routine goes from step S12 to step S17 and the change mind gear shift is allowed. Thus, the change mind (gear shift) request by means of automatic transmission section 9A is allowed and the down-shift gear shift which is the initial gear shift command is suspended and the change mind gear shift such that the target gear ratio is the gear ratio before the gear shift is executed.

It should, herein, be noted that, when the inertia phase during the down-shift gear shift is started, the frictional clutching element (first frictional clutching element) which is changed from the engagement state to the released state according to the down-shift of the gear shift is completely released. Therefore, even if this frictional clutching element (first frictional clutching element) is again engagement controlled, the engagement control is performed from the position to which the piston stroke is completely returned. Hence, the management of the piston stroke can be carried out with high accuracy. Consequently, the generations of the abrupt engagement and the delay in the engagement are suppressed. While the shock and the high-rpm idling (engine racing) are prevented from occurring, the change mind gear shift is executed and the gear shift control in conformity to the traveling state can be achieved.

(3) Occurrence of Change Mind Gear Shift Request Between Times t13' and t14'

In a case where the change mind gear shift request occurs from automatic transmission section 9A during the time duration from time t13' to time t14', in the flowchart shown in FIG. 3, the routine goes from step S1 to step S10. Since the change mind inhibit time has elapsed, the routine goes from step S10 to step S11.

Since the present time is after time t13', the actual gear ratio is equal to or larger than the first threshold value and the routine goes from step S11 to step S12.

However, after time t13', the actual gear ratio is equal to or larger than the second threshold value and the determination that the down-shift of gear shift is substantially completed is made. Accordingly, the routine shown in FIG. 3 goes from step S12 to step S13 and the change mind gear shift is inhibited. Thus, the change mind request by means of automatic transmission section 9A is inhibited and the down-shift of the gear shift which is the initial gear shift command is continued.

It should be noted that, if the down-shift gear shift is completely in the complete state, the frictional clutching element (second frictional clutching element) which is changed from the released state to the engagement state in response to the down-shift gear shift is almost in the engagement state. Therefore, if, under such a state as described above, the change mind gear shift is allowed, the control command becomes complicated, the engagement hydraulic pressure becomes unstable, and the shock is often generated. Whereas, since the down(-shift) gear shift is continued, this frictional clutching element (second frictional clutching element) is again not release controlled and the engagement hydraulic pressure state does not become unstable. Consequently, since the control commands do not become complicated and the shock can be prevented from occurring.

[Limitation Action of the Change Mind Gear Shift by Means of Manual Transmission Section]

FIGS. 6(a) and 6(b) show the gear ratio and whether the change mind gear shift request by means of the manual transmission section 9B occurs, FIG. 6(a) showing the up-shift gear shift and FIG. 6(b) showing the down-shift gear shift.

(Up(-Shift) Gear Shift)

Suppose a case where the request of the change mind gear shift from manual gear shift section 9B occurs during the up-shift gear shift such as shown in the gear ratio change of FIG. 6(a).

(1) Occurrence of Change Mind Request During a Time Duration from Time t20 to Time t22.

In a case where the change mind gear shift from manual transmission section 9B occurs during the time duration from time t20 to time t22 in FIG. 6(a), in the flowchart of FIG. 3, the routine goes from step S1 to step S2. It should be noted that, if the change mind inhibit time has elapsed, the routine goes from step S1 to step S3.

Before time t22, the actual gear ratio is in excess of the first threshold value and the determination that the inertia phase during the up(-shift) gear shift is not started is made. Therefore, the routine goes from step S3 to step S8. At this time, since the request of the change mind gear shift from manual transmission section 9B occurs, the gear shift request from manual transmission section 9B occurs, the routine shown in FIG. 3 goes from step S8 to step S9 and the change mind gear shift is allowed.

Thus, the change mind request from manual transmission section 9B is allowed, the up-shift gear shift which is the initial gear shift command is suspended, and the change mind gear shift such that the target gear ratio is the gear ratio before the gear shift is executed.

It should be noted that when it is before the inertia phase start during the up-shift gear shift, the frictional clutching element (first frictional clutching element) which varies from the engagement state to the release state according to the up-shift gear shift is not completely released. Therefore, if the change mind gear shift is allowed, the engagement control is again performed so that the generations of the abrupt engagement and engagement delay often occur from the detection error of the piston returning quantity.

However, the request of the change mind gear shift by means of manual transmission section 9B, namely, the gear shift command by means of manual transmission section 9B is due to the intention of the driver. Therefore, even if the time is before the inertia phase start during the up-shift gear shift, the change mind gear shift is allowed and the gear shift speed control in accordance with the intention of the driver can be achieved.

(2) Occurrence of the Change Mind Request at times t22~t23.

In a case where the change mind gear shift from manual transmission section 9B has occurred between time t22 and time t23 in FIG. 6(a), in the flowchart of FIG. 3, the routine goes from step S1 to step S2. It should be noted that, since the change mind inhibit time has elapsed, the routine goes from step S1 to step S3 via step S2.

After time t22, the actual gear ratio is smaller than the first threshold value and the determination that the inertia phase during the up-shift gear shift is started is made. Therefore, the routine goes from step S3 to step S4.

Then, before time t23, the actual gear ratio is in excess of the second threshold value and the determination that the up-shift gear shift is in progress is made. Therefore, the routine goes from step S4 to step S9 and the change mind gear shift is allowed.

Therefore, the change mind gear shift by means of manual transmission section 9B is allowed, the up-shift gear shift which is the initial gear shift command is suspended and the change mind gear shift such that the target gear ratio is set to the gear ratio before the gear shift is executed.

It should be noted that, if the inertia phase during the up-shift gear shift is started, the frictional clutching element (first frictional clutching element) which is varied from the engagement state to the release state due to the up-shift gear shift is completely released. Therefore, even if this frictional clutching element (first frictional element) is again engagement controlled, the engagement control is carried out from the position at which the piston stroke is completely returned. Hence, the management control of the piston stroke can be carried out with high accuracy.

Consequently, while the generations of the abrupt engagement and the engagement delay are suppressed, the shock and engine high-rpm delay (engine racing) are not prevented from occurring, the change mind gear shift is executed, and the gear shift control which meets the intention of the driver can be carried out.

(3) Occurrence of Change Mind Request at Time Duration from t23 to Time t24.

In a case where the change mind request occurs from manual transmission section 9B during times of t23 and t24 in FIG. 6(a), in the flowchart of FIG. 3, the routine goes from step S1 to step S2. It should be noted that, since the change mind inhibit time has passed, the routine goes to step S3.

After time t23, the actual gear ratio is below the first threshold value and the routine goes from step S3 to step S4.

However, after time t23, the actual gear ratio is below the second threshold value and the determination that the up-shift gear shift is substantially completed is made. Therefore, the routine goes from step S4 to step S5 and the change mind gear shift is inhibited. Thus, the change mind request by means of manual transmission is inhibited and the up-shift gear shift which is the initial gear shift command is continued.

It should, herein, be noted that, if the up-shift gear shift is substantially in the complete state, the frictional element (second frictional element) which varies from the released state to the engagement state according to the up-shift gear shift is almost in the engagement state. Therefore, if, in such a state as described above, the change mind gear shift is allowed, the control command becomes complicated, the engagement hydraulic pressure state becomes unstable, and the shock is often generated. Whereas, since the up-shift gear shift is continued, this frictional clutching element (second frictional clutching element) is again not release controlled and the engagement hydraulic pressure state does not become unstable. Consequently, the control commands do not become complicated and the development of the shock can be prevented.

(Down-Shift Gear Shift)

Suppose a case where the request of the change mind gear shift from manual transmission section 9B occurs during the down-shift gear shift during which the gear ratio variation as shown in FIG. 6(b) occurs.

(1) Occurrence of Change Mind Gear Shift Request Between Times t20' and t22'.

In a case where the change mind gear shift from manual transmission section 9B between times t20' and t22' in FIG. 6(b) occurs, the routine goes from step S1 to step S10 in the flowchart of FIG. 3. It should, herein, be noted that, if the change mind inhibit time is elapsed, the routine goes to step S11.

Before time t22', the actual gear ratio is below the first threshold value and the determination that the inertia phase during the downshift is not started is made. Therefore, the routine goes from step S11 to step S16. At this time, the request of the change mind gear shift from manual transmission section 9B occurs. The gear shift request occurs from manual transmission section 9B. Hence, the routine goes from step S16 to step S17 and the change mind gear shift is allowed.

Thus, the change mind gear shift request by means of manual transmission section 9B is allowed, the up-shift gear shift is suspended which is the initial gear shift command, and the change mind gear shift is executed at which the target gear ratio is the gear ratio before the gear shift.

It should be noted that, if it is before the inertia phase start during the down-shift gear shift, the frictional clutching element (first frictional clutching element) which varies from the engagement state to the released state due to the down-shift is not completely released. Therefore, if the change mind gear shift is allowed, the engagement control is again engagement controlled. Thus, due to the detection error of the piston returning quantity, the abrupt engagement and the engagement delay are often generated.

However, the request of change mind gear shift according to manual transmission section 9B, namely, the gear shift command by means of manual transmission section 9B is caused by the intention of the driver.

Therefore, even before the start of the inertia phase during the down-shift gear shift, the change mind gear shift is allowed so that the gear shift control in accordance with the intention of the vehicle driver can be achieved.

(2) Occurrence of Change Mind Request Between Times t22' and t23'

In a case where the change mind gear shift occurs from manual transmission section 9B between times t22' and t23', the routine goes from step S1 to step S10 in the flowchart of FIG. 3. Since the change mind inhibit time is elapsed, the routine goes to step S11.

Since the actual gear ratio is equal to or larger than the first threshold value at a time before time t22', AT controller 9 determines that the inertia phase during the down-shaft gear shift has started. Therefore, the routine goes from step S11 to step S12.

Before time t23', the actual gear ratio is below the second threshold value and AT controller 9 determines that the down-shift gear shift is in progress. Therefore, the routine goes from step S12 to step S17 and the change mind gear shift is allowed.

Therefore, the change mind gear shift request by means of manual transmission section 9B is allowed, the down-shift gear shift which is the initial gear shift command is suspended, and the change mind gear shift which makes the target gear ratio to be equal to the gear ratio before the gear shift is executed.

It should be noted that, if the inertia phase during the down-shift gear shift is started, the frictional clutching element (first clutching element) which varies from the engagement state to the released state according to the down-shift gear shift is completely released. Therefore, even if this frictional clutching element (first frictional clutching element) is again engagement controlled, the engagement control is carried out from the position at which the piston stroke is completely returned. Hence, the management of the piston stroke can carried out with high accuracy.

Consequently, the generations of the abrupt engagement and engagement delay are suppressed, while the shock and the engine high-rpm idling are prevented from occurring, the change mind gear shift is executed, and the gear shift control to conform to the intention of the driver can be achieved.

(3) Occurrence of Change Mind Gear Shift Request Between Time t23' and Time t24'.

In a case where the change mind gear shift occurs from manual transmission section 9B during the time between times t23' and t24' in FIG. 6(b), the routine goes from step S1 to step S10 in the flowchart of FIG. 3. Since the change mind inhibit time is elapsed, the routine goes step S11.

Since (the time is) after time t23', the actual gear ratio is equal to or larger than the first threshold value and the routine goes from step S11 to step S12.

However, after time t23', the actual gear ratio is equal to or larger than the second threshold value and AT controller 9 determines that the down-shift gear shift has completely be ended. Therefore, the routine goes from step S12 to step S13 and the change mind gear shift is inhibited. Thus, the change mind gear shift request by means of manual transmission section 9B is inhibited, and the down-shift gear shift which is the initial gear shift command is continued.

It should, herein, be noted that, if the down-shift gear shift is substantially in the completion state, the frictional clutching element (second frictional clutching element) which varies from the released state to the engagement state according to the down-shift gear shift is almost in the engagement state. Therefore, if, in such a state as described above, the change mind gear shift is allowed, the control command becomes complicate, the engagement hydraulic pressure state becomes unstable and the shock often occurs.

Whereas, since the downshift gear shift is continued, the frictional clutching element (second frictional clutching element) is not again release controlled and the engaged hydraulic pressure state is not unstable. Consequently, the control command is not complicated and the occurrence of the shock can be prevented.

[A Time Limitation Action of the Change Mind Gear Shift]

FIG. 7 is an explanatory view representing a target gear stage, a throttle opening angle, a vehicular acceleration, the actual gear ratio, and each characteristic between a command hydraulic pressure and actual hydraulic pressure in the first frictional clutching element, and each characteristic between the command hydraulic pressure and the actual hydraulic pressure of the second frictional clutching element, when the change mind gear shift is executed.

At a time t30 in FIG. 7, the vehicle is in a, so-called, coast state in which the accelerator pedal is not depressed. In this state, a throttle (valve) opening angle Tvo is decreased.

At a time t31, when throttle (valve) opening angle Tvo is below a predetermined value, the target gear stage is set to a value higher than the present gear stage and the up-shift gear shift command is outputted so that the target gear stage is changed from the first gear shift stage to the second gear shift stage.

Thus, the first frictional clutching element which has been engaged at the first gear shift stage is release controlled. On the other hand, the second frictional clutching element which has been released at the first shift stage is engagement controlled.

That is to say, at a time t32, the command hydraulic pressure of the first frictional clutching element is decreased according to the release control. On the other hand, at time t32, the command hydraulic pressure of the first frictional clutching element by means of the release control is decreased. On the other hand, at time t32, the engagement control causes the command hydraulic pressure of the second frictional clutching element to be raised. It should be noted that the hydraulic pressure supplied to the second hydraulic pressure clutching element of the engagement side is, at first, a pre-charge hydraulic pressure to perform the backlash reduction. Therefore, the hydraulic pressure command to be outputted to the second frictional clutching element at time t32 is a pre-charge hydraulic pressure command.

At a step t33, the actual hydraulic pressure of the first frictional clutching element is started to be decreased in accordance with the command hydraulic pressure. At a time t34, the actual hydraulic pressure of the second frictional clutching element is started to be raised in accordance with the command hydraulic pressure. At a time t35, the pre-charge hydraulic pressure command is switched to a normal engagement hydraulic pressure command. At a time t36, the actual hydraulic pressure of the second frictional clutching element is started to moderately be raised.

As described above, the release control in the first frictional clutching element and the engagement control in the second frictional clutching element are advanced so that, at a time t37, the actual gear ratio is stated to be gradually decreased. Then, at a time t38, the first frictional clutching element is completely in the released state and the inertia phase during the up-shift gear shift is started.

Then, when, at a time t39, the accelerator pedal is depressed so that throttle (valve) opening angle Tvo is increased, the target gear stage is set to the gear stage before the up-shift gear shift control and the change mind gear shift request is outputted in order for the target gear stage to be modified, for example, from the second gear shift stage to the first gear shift stage.

Thus, the first frictional clutching element which has been release controlled during the up-shift gear shift is engagement controlled. On the other hand, the second frictional clutching element which has been engagement controlled during the up-shift gear shift is release controlled.

That is to say, at a time t39, the command hydraulic pressure of the first frictional clutching element is raised due to the engagement control. It should be noted that the hydraulic pressure supplied to the engagement side first frictional clutching element is, at first, pre-charge hydraulic pressure to perform the backlash reduction. Therefore, the hydraulic pressure command outputted to the first frictional clutching element at time t39 is the pre-charge hydraulic pressure command.

On the other hand, at time t39, the second frictional clutching element engagement controlled is in the release control. At this time, when, in the engagement control of the second frictional clutching element, the pre-charge is not completed, the backlash reduction in the second frictional clutching element is not completed but an assured rise in the actual pressure cannot be achieved.

Therefore, the piston stroke is, so called, not in time. Thus, the second frictional clutching element cannot be released. As shown in a broken line of FIG. 7, an engine racing due to the piston stroke not in time is developed, the vehicular acceleration is disordered, and the vehicular shock is often generated.

Therefore, as denoted by A section in FIG. 7, the engagement control by means of the second frictional clutching element is continued, the engagement of the first frictional clutching element is secured, and, thereafter, the second frictional clutching element is release controlled. Thus, the generations of the racing and shock can be suppressed.

As described above, until the passage of the predetermined time (change mind inhibit time) from the issuance of the first gear shift command, in the second frictional clutching element which is released in the first gear shift stage and engaged in the second gear shift stage, the backlash reduction according to the pre-charge hydraulic pressure is not completed and before the completion of the piston stroke.

Therefore, if the change mind gear shift is allowed before the completion of the piston stroke, so-called, the piston stroke is not in time.

Thus, the racing occurs due to not in time of the piston stroke, the vehicular acceleration is disordered, and the shock is often generated.

Thus, at step S2 or step S10 in the flowchart of FIG. 3, AT controller 9 determines whether the change mind inhibit time has been elapsed.

In a case where the request of the change mind gear shift from automatic transmission section 9A occurs before the passage of the change mind inhibit time, viz., before the completion of the piston stroke of the engagement side second frictional clutching element, the routine goes from step S2 to step S7 via step S6 or goes from step S10 to step S25 via step S14 so that the change mind gear shift is inhibited.

Therefore, the change mind request by means of the automatic transmission section 9A is inhibited and the initial gear shift control is continued.

As described above, at a time before the piston stroke completion of the engagement side second frictional clutching element, the request of the change mind gear shift from automatic transmission section 9A is inhibited so that the engine racing due to the fact that the piston stroke is not completed can be suppressed.

Especially, in a case of a up-shift gear shift in the coast state, the release of the first frictional clutching element causes the inertia phase to be started. However, even if the inertia phase is started, the piston stroke in the second frictional clutching element is often not completed. Therefore, after a time at which the piston stroke of the engagement side second frictional clutching element is completed is waited, the change mind gear shift is allowed. Thus, the engine racing due to the fact that the piston stroke is not completed can assuredly be suppressed.

On the other hand, in a case where, before the passage of the change mind inhibit time, namely, before the completion of the piston stroke of the engagement side second frictional clutching element, the request of the change mind gear shift from manual transmission section 9B occurs, during the time of the up-shift gear shift, the routine shown in FIG. 3 goes from step S2 to step S3 via step S6. Then, since the request of the change mind gear shift from manual transmission section 9B occurs even if the actual gear ratio is equal to or larger than the first threshold value, the routine goes from step S3 to step S9 via step S8 and the change mind gear shift is allowed. In addition, during the time of the down-shift gear shift, the routine goes from step S10 to step S11 via step S14. Since the change mind gear shift request from manual transmission section 9B occurs even if the actual gear ratio is below the first threshold value, the routine goes from step S11 to step S17 via step S16 so that the change mind gear shift is allowed. Consequently, the change mind request according to the manual transmission section 9B is allowed, the initial gear shift control is suspended, and the change mind gear shift in which the target gear ratio is the gear ratio before the gear shift is executed.

It should be noted that a state before the passage of the change mind inhibit time indicates the state in which, in one of the fictional clutching elements (second frictional clutching element) which is changed from the released state to the engagement state according to the initial gear shift control, the piston stroke is not completed and the backlash reduction is not completed.

Therefore, if the change mind gear shift is allowed, the shock and racing would occur due to the fact that the piston stroke is not in time.

However, the request of the change mind gear shift by means of manual transmission section 9B, viz., the gear shift command by means of manual transmission section 9B is according to the intention of the vehicle driver. Therefore, even before the passage of change mind inhibit time, the change mind gear shift is allowed and the gear shift control in accordance with the intention of the driver can be achieved.

Next, an effect of the present invention will be described below.

The control apparatus for the automatic transmission in the first embodiment can obtain the following effects.

(1) A control apparatus for an automatic transmission in which a first frictional clutching element which is engaged at a first gear shift stage and which is released at a second gear shift stage is equipped, the control apparatus comprising: automatic transmission means (an automatic transmission section) 9A for executing a gear shift to a gear shift stage automatically set on a basis of a traveling state; manual transmission means (a in manual transmission section) 9B for executing a gear shift to a gear shift stage set through a manual operation; inertia phase determining means (step S3, step S11) for determining a start of an inertia phase during the gear shift from the first gear shift stage to the second gear shift stage; and change mind gear shift determining means (FIG. 3) for inhibiting the gear shift from the second gear shift stage to the first gear shift stage and continuing the gear shift from the first gear shift stage to the second gear shift stage, when, during the gear shift from the first gear shift stage to the second gear shift stage, a request of the gear shift from the second gear shift to the first gear shift by means of the automatic transmission means occurs before the start of the inertia phase and suspending the gear shift from the first gear shift stage to the second gear shift stage and allowing the gear shift from the second gear shift stage to the first gear shift stage, when, during the gear shift from the first gear shift stage to the second gear shift stage, another request of the gear shift from the second gear shift stage to the first gear shift stage by means of the manual transmission means occurs before the start of the inertia phase.

Therefore, while the developments of the shock and the racing are prevented, the gear shift control in accordance with the intention of the driver can be executed.

(2) The control apparatus for the automatic transmission as described in item (1), wherein a second frictional clutching element which is released at the first gear shift stage and engaged at the second gear shift stage is equipped, the change mind gear shift determining means (FIG. 3) inhibits the gear shift from the second gear shift stage to the first gear shift stage and continues the gear to shift from the first gear shift stage to the second gear shift stage, when a request of the gear shift from the second gear shift stage to the first gear shift stage by means of the automatic transmission means occurs within a predetermined time (change mind inhibit time) from the start of the gear shift from the first gear shift stage to the second gear shift stage and suspends the gear shift from the first gear shift stage to the second gear shift stage and allows the gear shift from the second gear shift stage to the first gear shift stage, when another request of the gear shift from the second gear shift stage to the first gear shift stage by means of the manual transmission means occurs within the predetermined time (change mind inhibit time) from the start of the gear shift from the first gear shift stage to the second gear shift stage.

Therefore, while the racing due to the fact that the piston stroke of the second frictional clutching element is not completed is suppressed, the gear shift control in accordance with the intention of the driver can be executed.

The control apparatus for the automatic transmission has hereinabove been explained on a basis of the first preferred embodiment. However, a specific structure is not limited to this embodiment. Various design change and modifications are permitted without departing from the scope and sprit of the respective claims.

In the above-described embodiment, the start of inertia phase is determined if the gear ratio is varied by a predetermined value (if the gear ratio has reached to the first threshold value). However, the present invention is not limited to this. For example, if the time for the initial gear shift command is outputted is detected and if this time exceeds a predetermined time, the start of the inertia phase may be determined.

In this embodiment, automatic transmission 3 is mounted in an engine equipped vehicle in which engine 1 is a traveling driving source. However, the present invention is not limited to this. The present invention is applicable to a hybrid vehicle in which the engine and an electric motor are the traveling driving sources or an electric automotive vehicle in which only the electric motor is the traveling driving source.

The invention claimed is:

1. A control apparatus for an automatic transmission in which a first frictional clutching element which is engaged at a first gear shift stage and which is released at a second gear shift stage is equipped, the control apparatus comprising:
   automatic transmission means for executing a gear shift to a gear shift stage automatically set on a basis of a traveling state;
   manual transmission means for executing the gear shift to the gear shift stage set through a manual operation;
   inertia phase determining means for determining a start of an inertia phase during the gear shift from the first gear shift stage to the second gear shift stage; and
   change mind gear shift determining means for inhibiting the gear shift from the second gear shift stage to the first gear shift stage and continuing the gear shift from the first gear shift stage to the second gear shift stage, when, during the gear shift from the first gear shift stage to the second gear shift stage, a request of the gear shift from the second gear shift stage to the first gear shift stage by means of the automatic transmission means has occurred during a time duration from a time at which a gear shift command from the first gear shift stage to the second gear shift stage is issued to a time at which the inertia phase is started and suspending the gear shift from the first gear shift stage to the second gear shift stage and allowing the gear shift from the second gear shift stage to the first gear shift stage, when, during the gear shift from the first gear shift stage to the second gear shift stage, another request of the gear shift from the second gear shift stage to the first gear shift stage by means of the manual transmission means has occurred during the time duration from a time at which the gear shift command from the first gear shift stage to the second gear shift stage is issued to a time at which the inertia phase is started.

2. The control apparatus for the automatic transmission as claimed in claim 1, wherein a second frictional clutching element which is released at the first gear shift stage and which is engaged at the second gear shift stage is equipped in the automatic transmission and the change mind gear shift determining means inhibits the gear shift from the second gear shift stage to the first gear shift stage and continues the gear shift from the first gear shift stage to the second gear shift stage, when the request of the gear shift from the second gear shift stage to the first gear shift stage by means of the automatic transmission means has occurred within a predetermined time from the start of the gear shift from the first gear shift stage to the second gear shift stage and suspends the gear shift from the first gear shift stage to the second gear shift stage and allows the gear shift from the second gear shift stage to the first gear shift stage, when the other request of the gear shift from the second gear shift stage to the first gear shift stage by means of the manual transmission section has occurred within the predetermined time from the start of the gear shift from the first gear shift stage to the second gear shift stage.

* * * * *